United States Patent
Le Rouzic et al.

(10) Patent No.: US 10,313,400 B2
(45) Date of Patent: Jun. 4, 2019

(54) METHOD OF SELECTING A NETWORK RESOURCE

(75) Inventors: Jean-Claude Le Rouzic, Trebeurden (FR); José Doree, Lannion (FR)

(73) Assignee: 3G LICENSING S.A., Luxembourg (LU)

(*) Notice: Subject to any disclaimer, the term of this patent is extended or adjusted under 35 U.S.C. 154(b) by 476 days.

(21) Appl. No.: 13/381,600

(22) PCT Filed: Jun. 21, 2010

(86) PCT No.: PCT/FR2010/051252
§ 371 (c)(1),
(2), (4) Date: Jan. 26, 2012

(87) PCT Pub. No.: WO2011/001061
PCT Pub. Date: Jan. 6, 2011

(65) Prior Publication Data
US 2012/0127991 A1    May 24, 2012

(30) Foreign Application Priority Data
Jun. 30, 2009    (FR) .................................... 09 54468

(51) Int. Cl.
*H04L 29/06*    (2006.01)
(52) U.S. Cl.
CPC ........ *H04L 65/1016* (2013.01); *H04L 65/105* (2013.01); *H04L 65/1006* (2013.01)
(58) Field of Classification Search
USPC ....... 370/248, 252, 259, 260, 261, 264, 352, 370/468, 469; 709/204, 206, 207, 223,
(Continued)

(56) References Cited

U.S. PATENT DOCUMENTS

| | | | |
|---|---|---|---|
| 6,567,667 B1* | 5/2003 | Gupta | ................... H04W 48/18 455/434 |
| 8,059,656 B1* | 11/2011 | Telikepalli et al. | ........ 370/395.2 |

(Continued)

FOREIGN PATENT DOCUMENTS

| | | |
|---|---|---|
| WO | 2004112415 A2 | 12/2004 |
| WO | 2007091808 A1 | 8/2007 |

(Continued)

OTHER PUBLICATIONS

Wikipedia (Wayback Machine) Jun. 16, 2009, web.archive.org/web/20090616183842/http://en.wikipedia.org/wiki/OSI_model, whole document.*

(Continued)

*Primary Examiner* — Hanh N Nguyen
*Assistant Examiner* — Jose L Perez
(74) *Attorney, Agent, or Firm* — David D. Brush; Westman, Champlin & Koehler, P.A.

(57) ABSTRACT

A method and apparatus are provided for selecting a network resource, in which a "controlled-entity" device connected to an IP network (20) is also capable of accessing at least one other physical and/or virtual telecommunications network. According to the method, after a step in which a request is sent or relayed by the controlled-entity or is sent to the controlled-entity, the controlled-entity then receives a session control signal containing a resource identifier representative of the physical or virtual network that the controlled-entity may or must use in order to satisfy the request.

24 Claims, 2 Drawing Sheets

(58) Field of Classification Search
USPC ....... 709/224, 225, 226, 227, 228, 229, 239, 709/240, 244
See application file for complete search history.

(56) References Cited

U.S. PATENT DOCUMENTS

| | | | |
|---|---|---|---|
| 2003/0037146 A1* | 2/2003 | O'Neill | 709/226 |
| 2004/0190689 A1* | 9/2004 | Benitez Pelaez | H04L 65/1069 379/88.13 |
| 2005/0075129 A1* | 4/2005 | Kuchibhotla | H04W 48/18 455/552.1 |
| 2007/0209061 A1* | 9/2007 | Dekeyzer et al. | 726/3 |
| 2007/0259651 A1* | 11/2007 | Bae | H04L 29/06027 455/412.1 |
| 2007/0280264 A1* | 12/2007 | Milton et al. | 370/395.31 |
| 2008/0209532 A1* | 8/2008 | Wen | H04L 63/08 726/9 |
| 2008/0271113 A1* | 10/2008 | Belling | 726/1 |
| 2008/0285543 A1* | 11/2008 | Qiu | H04L 65/1069 370/352 |
| 2009/0003276 A1* | 1/2009 | Mutikainen | H04W 48/18 370/329 |
| 2010/0014508 A1* | 1/2010 | Yang | H04M 7/0057 370/352 |
| 2010/0278125 A1* | 11/2010 | Clair | H04Q 3/66 370/329 |

FOREIGN PATENT DOCUMENTS

| | | | | |
|---|---|---|---|---|
| WO | WO 2009008704 A1 | * | 1/2009 | ......... H04L 65/1073 |
| WO | WO 2009053194 A1 | * | 4/2009 | ......... H04L 65/1069 |
| WO | WO 2010047641 A1 | * | 4/2010 | |

OTHER PUBLICATIONS

Wikipedia (Wayback Machine) Aug. 10, 2009, web.archive.org/web/20090810231707/http://en.wikipedia.org/wiki/Forwarding_plane, whole document.*

Ellanti et al., Next Generation Transport Networks: Data, Management, and Control Planes, Dec. 5, 2005, Springer Science & Business Media, p. 271.*

Mishra, Fundamentals of Cellular Network Planning and Optimisation: 2G/2.5G/3G . . . Evolution to 4G, May 21, 2004, John Wiley & Sons, p. 18.*

Fedyk et al., RFC4394 (A Transport Network View of the Link Management Protocol (LMP)), Feb. 2006, p. 3.*

Skorin-Kapov et al., Application-Level QoS Negotiation and Signaling for Advanced Multimedia Services in the IMS, Jul. 2007, IEEE Communications Magazine, pp. 108-116 (Year: 2007).*

International Search Report and Written Opinion dated Aug. 12, 2010 for corresponding International Application No. PCT/FR2010/051252, filed Jun. 21, 2010.

English Translation of the International Preliminary Report on Patentability and Written Opinion dated Aug. 12, 2012 for corresponding International Application No. PCT/FR2010/051252, filed Jun. 21, 2010.

* cited by examiner

METHOD OF SELECTING A NETWORK RESOURCE

CROSS-REFERENCE TO RELATED APPLICATIONS

This Application is a Section 371 National Stage Application of International Application No. PCT/FR2010/051252, filed Jun. 21, 2010, which is incorporated by reference in its entirety and published as WO 2011/001061 on Jan. 6, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to Internet protocol (IP) networks, and in particular to those that are suitable for implementing advanced session control protocols. IP networks enable conversation data to be delivered, such as voice over IP (VoIP), "content sharing", "presence", or "instant messaging".

More particularly, the present disclosure relates to the elements implemented for enabling the initiator or the destination of a multimedia stream to make use of the network resource that is the most appropriate from amongst the resources they have available.

BACKGROUND OF THE DISCLOSURE

Conventional advanced session control protocols, such as the H.323 protocol and session initiation protocol (SIP) make use of so-called "signaling" messages that are messages that enable a terminal to request a connection with another terminal, or similarly messages indicating that a telephone line is busy, or indicating that the called telephone is ringing, or indeed indicating that such and such a telephone is connected to the network and may be reached in such and such a manner.

The H.323 protocol was developed by the International Telecommunication Union standardization sector for telecommunication (ITU-T). It specifies procedures concerning signaling, codec negotiation, and information transport. It is in widespread use by the manufactures of voice equipment and of video conference equipment, and also in several real time Internet applications such as "NetMeeting".

The SIP was defined by the Internet engineering task force (IETF) in its document RFC 3261. This protocol makes it possible to establish, modify, and terminate multimedia sessions in a network using IP protocol. The SIP protocol also provides procedures for notifying events and sending information outside the context of a session. It is in widespread use for making orders for instant messaging services. Thus, in an SIP environment, there are various types of communication such as requests for setting up sessions and requests that are exchanged without any dialog. In devices that comply with this protocol, the associated functions are implemented by a logic unit referred to as a "user agent" that behaves as a "client" or as a "server", depending on circumstances.

The disclosure is particularly suitable for infrastructures of the IP multimedia subsystem (IMS) type. The IMS was defined by the Standardization organizations known as the 3rd generation partnership project (3GPP) and the Telecommunications and Internet converged services and protocols for advanced networking (TISPAN). It is a network architecture that was introduced by the 3GPP for mobile networks and then reused by TISPAN for fixed networks. This architecture, which uses SIP protocol, enables multimedia sessions to be set up dynamically and to be controlled between two clients, and it also enables resources to be reserved at the level of the network transporting multimedia streams. By virtue of this architecture, network operators can conveniently implement management policy, deliver a predetermined quality of service, and calculate how much to bill their clients. At present, IMS gives access to services of the following type: telephony, video telephony, presence, and instant messaging, and it also manages the interaction thereof.

When a client registered on a network such as those described above desires to benefit from a multimedia service made available by the network, the client transmits a signaling message to the network or receives one from the network. It sometimes happens that clients have the possibility of using different resources for transporting a given multimedia stream. The network resources concerned by the present disclosure are physical or virtual networks.

In conventional manner, a "physical network" is a set of electromechanical characteristics for transporting data in the form of bits (layer 1 in the open systems interconnection (OSI) model). To make a connection, a client may have various physical interfaces available (e.g. optical fibers, pairs of copper wires, or radio interfaces).

A "virtual network" is constructed on the basis of a physical network and comprises connected communications operating in packet mode. A virtual network makes it possible to obtain specific characteristics, e.g. in terms of quality of service (e.g. data rate, latency, or jitter), in terms of security (e.g. encryption or authentication), or in terms of routing (e.g. a virtual private network (VPN)). A virtual network is conventionally declared on layer 2, 3, or 4 (or intermediate) of the OSI model. When different virtual networks are declared on a given physical network, they are distinguished from one another by identifiers specific to the corresponding OSI layer.

In the technology based on the physical network (X.25, asynchronous transfer mode (ATM), integrated services digital network (ISDN), IP, etc.), it is possible to declare different types of virtual networks. Here are a few examples.

In X.25, the virtual network is identified by a virtual channel identifier (VCI). In ATM, a virtual network is identified by a VCI and also by a virtual path identifier (VPI). X.25 and ATM technologies provide two types of connection: those associated individually with a call referred to as "switched virtual circuits" (SVC), and those set up on a permanent basis between two terminals, referred to as "permanent virtual circuits" (PVC).

In ISDN, the permanent logic link (PLL) service enables user data to be transferred in the form of frames conveyed in the "D-channel".

In the context of IP, it is possible to use the following:
a virtual local area network (VLAN) in which a dedicated label is added to the data packet headers (layer 2 or layer 3 of the OSI model); or a multiprotocol label switching tunnel (MPLS) in which, once more, the data packets are labeled (layer 2 of the OSI model); or else IPSec that makes traffic over IP secure by authentication and/or encryption of data packets (layer 3 of the OSI model).

The client device having such resources accessible thereto may for example be a fixed terminal or a mobile terminal, or a residential gateway, or indeed a voice gateway of the network operator such as a digital subscriber line access multiplexer (DSLAM) with SIP, i.e. a device that collects digital subscriber line data traffic transiting over some number of telephone lines.

It can then be asked whether it might not be advantageously possible for a client of a multimedia stream who has access to a plurality of network resources to select a particular resource as a function of practical parameters such as: the identity of the sender of a request to set up a multimedia session; and/or the destination of said request; and/or the nature of the stream; and/or the dialed number, etc.

For example, if a voice call is identified as being an emergency call, it may make use of a priority resource.

As another example, a database may define particular categories of clients, for example clients in a category referred to as "secret-services" may be agents of a counter-espionage government service. They could then be allocated secure communications channels when making or receiving calls.

Yet another example might be to select the resource as a function of the nature of a given multimedia stream (audio, video, image, etc.) and of its technical characteristics (data rate, etc.).

In the state of the art, including under SIP protocol, there is no provision in the protocol for informing a client about the network resource that the client may or must select for use. In certain circumstances, recourse is made to palliative solutions that require dedicated equipment to be deployed; such solutions are therefore expensive and complicated to implement.

SUMMARY

In a first aspect, an embodiment of the present invention thus provides a method of selecting a network resource, in which a "controlled-entity" device connected to an IP network may also access at least one other physical and/or virtual telecommunications network, the method including a step in which a request is sent or relayed by said controlled-entity or is sent to said controlled-entity. The method is remarkable in that the controlled-entity then receives a session control signal containing a resource identifier representative of the physical or virtual network that the controlled-entity may or must use in order to satisfy said request.

The term "request" is used herein to mean any request to set up a multimedia session, whether a telephone call, a computer method request, or a service request. In the description below, the identity originating a request is referred to as a "requesting" entity, and the destination entity of a request is referred to as the "requested" entity.

Where appropriate, it should be observed that the network requested for satisfying said request may be the (physical) IP network, itself.

Thus, in an embodiment of the invention, it is possible firstly to perform different switching "at the source" by informing a client seeking to set up or relay a multimedia stream about the network resource that is the most appropriate for use in transporting that stream. Secondly, it is also possible to inform a destination client to whom a multimedia stream is destined about the network resource that is the most appropriate for use in transporting the stream.

It should be observed, that as a function of the policy selected by the network operator, it is possible, where appropriate, for the controlled-entity to be authorized to select a network resource of a type other than the type associated with the received resource identifier. As explained below, such a characteristic may be advantageous in particular when the controlled-entity finds that it is not possible to select a network resource in compliance with the received resource identifier; under such circumstances, according to particular characteristics, the controlled-entity may advantageously select another network resource from the resources available thereto.

According to other particular characteristics, said controlled-entity sends a session control signal to the IP network, which signal contains information specifying that the controlled-entity possesses the means required for interpreting resource identifiers in terms of physical or virtual networks.

By these provisions, the network operator is informed of the possibility to control a client implementing an embodiment of the present invention. These provisions might be used, for example, on each initial registration of a client in the IP network.

In a second aspect, an embodiment of the invention also provides a method of selecting a network resource, the method including a step of a so-called "controller" device intercepting in an IP network a request sent or relayed by a "controlled-entity" device or sent to a "controlled-entity" device. Said method is remarkable in that said controller then sends to the controlled-entity a session control signal containing a network identifier representative of a physical or virtual network that the controlled-entity may or must use in order to satisfy said request.

The advantages of this second aspect of an embodiment of the invention are the same as those of the first aspect.

According to particular characteristics:

the controller then receives from said controlled-entity a resource identifier representative of the network resource that the controlled-entity has actually selected; and the controller uses said information to determine whether said request should be satisfied or rejected.

By means of these provisions, the policy selected by the network operator for this purpose can be implemented immediately.

Correspondingly, an embodiment of the invention also provides various devices.

Thus, in a third aspect, an embodiment of the invention provides a "controlled-entity" device connected to an IP network and capable also of accessing at least one other physical and/or virtual telecommunications network, the device including means for acting, after a request has been sent or relayed by said controlled-entity or sent to said controlled-entity, to receive a session control signal following from said request. Said device is remarkable in that it further includes means for interpreting a resource identifier contained in said session control signal and representative of the physical or virtual network that the controlled-entity may or must use in order to satisfy said request.

According to particular characteristics, said controlled-entity device includes means for selecting another network resource if it finds that it is impossible to select a network resource in accordance with said received resource identifier.

According to other particular characteristics, said controlled-entity device includes means for subsequently transmitting a session control signal to the IP network, the signal containing a resource identifier representative of the network resource that the controlled-entity device has actually selected.

According to yet other particular characteristics, said controlled-entity device includes means for sending a session control signal to the IP network, which signal informs that the controlled-entity possesses the means necessary for interpreting the resource identifiers in terms of physical or virtual networks.

In a fourth aspect, an embodiment of the invention also provides a "controller" device situated in an IP network and including means for intercepting a request sent or relayed by a "controlled-entity" device or sent to a "controlled-entity" device. Said device is remarkable in that it further includes means for then sending a set of control signals to said controlled-entity, the signal containing a resource identifier representative of a physical or virtual network that the controlled-entity may or must use in order to satisfy said request.

According to particular characteristics, said controller device further includes means for determining whether said request should be satisfied or rejected on the basis of a session control signal received from said controlled-entity and containing a resource identifier representative of the network resource actually selected by the controlled-entity.

According to other particular characteristics, said controller device further includes means for taking account of the information that the controlled-entity possesses the means necessary for interpreting the resource identifiers in terms of physical or virtual networks.

The advantages provided by these devices are essentially the same as the advantages provided by the corresponding methods briefly summarized above.

It should be observed that it is possible to implement the devices briefly described above in the context of software instructions and/or in the context of electronic circuits.

An embodiment of the invention also provides a computer program downloadable from a communications network and/or stored on a computer-readable medium and/or executable by a microprocessor. The computer program is remarkable in that it includes instructions for executing steps of any of the network resource selection methods briefly summarized above, when executed on a computer.

The advantages provided by the computer program are essentially the same as those offered by said methods.

BRIEF DESCRIPTION OF THE DRAWINGS

Other aspects and advantages appear on reading the following detailed description of particular implementations, given as non-limiting examples. The description refers to the accompanying figures, in which.

DETAILED DESCRIPTION OF ILLUSTRATIVE EMBODIMENTS

Figure 1:
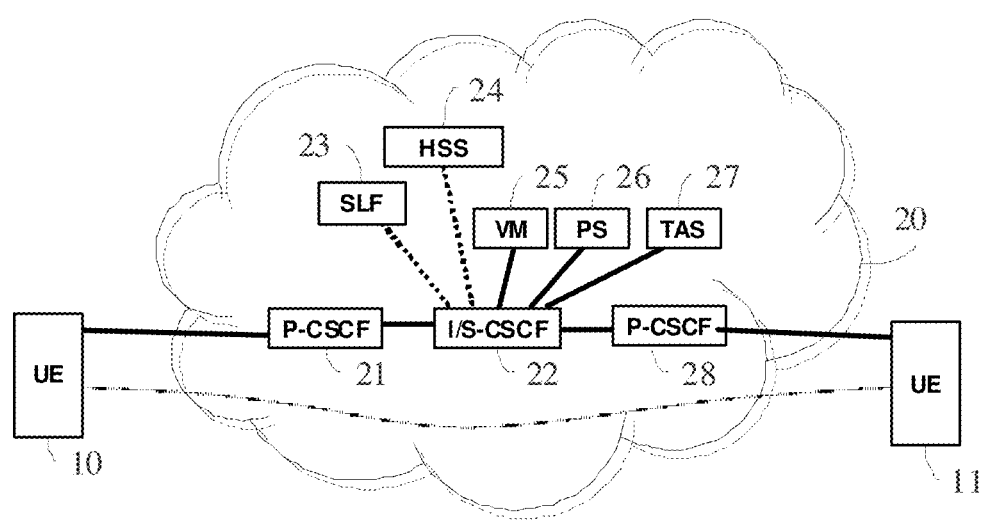
FIG. 1 is a diagram of a system for providing multimedia services and suitable for implementing an embodiment of the invention.

The system shown in FIG. 1 is based on an IMS type network architecture as explained briefly above. The multimedia services offered by such a system may comprise the following services: telephony, video telephony, content sharing, presence, instant messaging, or television. These services are made available to the user of a user equipment (UE) terminal 10 in a network 20 including an IP transport infrastructure and servers through which the terminal 10 can exchange multimedia streams and session control signals in accordance with the SIP protocol, in particular with another UE terminal 11, the terminals 10 and 11 being previously registered with IMS servers of the network 20.

The terminal 10, 11 may be a fixed or mobile terminal, or a home or business gateway, having SIP signaling means and possibly including means for playing back audiovisual content.

As shown in FIG. 1, this system for supplying multimedia services relies on a network 20 in compliance with the IMS architecture as defined in the 3GPP, and that comprises:
  an IP transport infrastructure (not shown);
  one or more call servers combining both an interrogating-call server control function and a serving-call server control function in a single server (written I/S-CSCF); in particular, an I/S-CSCF call server 22 manages the procedure for registering devices that are connected to the network 20; in order to enable such a device to benefit from the services provided by the network, and ignoring exceptions (certain emergency calls), it is necessary for the device to register with the I/S-CSCF server 22; the I/S-CSCF server 22 also manages the routing of signaling between the terminal 10 and the voice messaging (VM) servers 25, presence servers (PS) 26, and telephony application servers (TAS) 27, and also routing towards other terminals managed by the same IMS network (such as the terminal 11, for example) and routing signaling between the IMS network 20 and other networks (not shown);
  one or more servers presenting a proxy-call server control function (P-CSCF); the P-CSCF server 21 (or 28) is the SIP contact point of the terminal 10 (or 11) in the IMS network; thus, all of the SIP signaling exchanged between the terminal 10 (or 11) and the I/S-CSCF call server 22 passes via the corresponding P-CSCF server 21 (or 28);
  one or more database servers of the home subscriber server (HSS) type; where an HSS server 24 contains the profile of the user of the terminal 10 in terms of authentication data, location, and service subscriptions;
  optionally a server of the subscriber location function (SLF) type; an SLF server 23 is used in networks that have a plurality of HSS servers; the SLF server 23 is interrogated by the I-CSCF and S-CSCF functions in order to find the address of the HSS server 24 housing the data concerning the user of the terminal 10;
  one or more voice message (VM) servers 25, the VM server 25 manages the subscribing of the terminal 10 to message deposition/consultation events by the user of this terminal, and it notifies the terminal 10 when such events occur;
  one or more presence servers (PS) 26; the PS 26 managing the subscribing of the terminal 10 to the presence events that the user of that terminal seeks to monitor, and notifies the terminal when such an event occurs; and
  one or more telephony application servers (TAS) 27; a TAS managing the telephone services to which the user of the terminal 10 has a subscription with the operator, such as calling-number presentation or call forwarding.

The voice message (VM) servers 25, the presence servers (PS) 26, and the telephony application servers (TAS) 27 are examples of so-called "application servers" (AS).

The database server HSS 24 is interrogated in particular:

by the I-CSCF function when registering a terminal 10 in order to allocate an I/S-CSCF server 22 to the user of the terminal or to find the I/S-CSCF server 22 already allocated to the user;

by the S-CSCF function on initial registration of the terminal 10 in order to download data concerning the services to which the user has subscribed, including in particular the detection points that enable the I/S-CSCF server 22 to determine which signaling message it should convey to which application server (such as for example the VM 25, the PS 26, or the TAS 27);

by the S-CSCF function during registrations of the user of the terminal 10, in order to inform the HSS 24 of a registration of said user with the I/S-CSCF server 22 or of that registration being prolonged; and by the S-CSCF function in order to recover the information needed for authenticating the signaling sent by the user of the terminal 10.

The operation and the advantages of an embodiment of the invention are illustrated below in the context of an implementation shown in FIG. 2.

An embodiment of the invention makes use of the notions of a "controller" and a "controlled-entity": a "controller" is an entity that informs the "controlled-entity" of the preferred or exclusive choice of a resource (physical and/or virtual network, as defined above) of the transport plane.

In the architecture shown by way of example in FIG. 1:

the controlled-entity role may be played in particular by the terminal 10 or the terminal 11, or by a voice gateway (not shown) of the network operator; and the role of controller may be played in particular by an S-CSCF or I/S-CSCF server 22 and/or one of the application servers 25, 26, and 27.

To clarify ideas, consideration is given below to the terminal 10 acting solely as a requesting controlled-entity, the terminal 11 in the role of a requested controlled-entity, and the I/S-CSCF server 22 in the role of the controller for both of the terminals 10 and 11.

According to an embodiment of the invention, a resource identifier is defined that is in the form of an arbitrary alphanumeric string. This identifier is preferably inserted in some of the signaling messages exchanged by the controller and controlled-entity entities. It is thus possible to select a resource type on a call-by-call basis, on a method-by-method basis, or indeed on a service-by-service basis, as a function of criteria that are specific to the controller.

In this respect, it should be observed that concrete identification of a resource (this physical network or that virtual network) needs to be performed by the controlled-entity that receives the resource identifier of an embodiment of the invention, and should not be the responsibility of the controller, which merely needs to recognize that there is a need for a particular utilization, without being concerned about real implementation (which may change over the course of time). This ensures that control plane is independent of the transport plane (and more particularly that the layers of the OSI model are independent from one another). The resource identifier exchanged between the controller and the controlled-entity is thus purely logical. The distinction between a "resource identifier" of an embodiment of the invention and the concrete identification of the resource enables the controller to remain transparent to the variations and modifications that take place in the transport plane.

Figure 2:
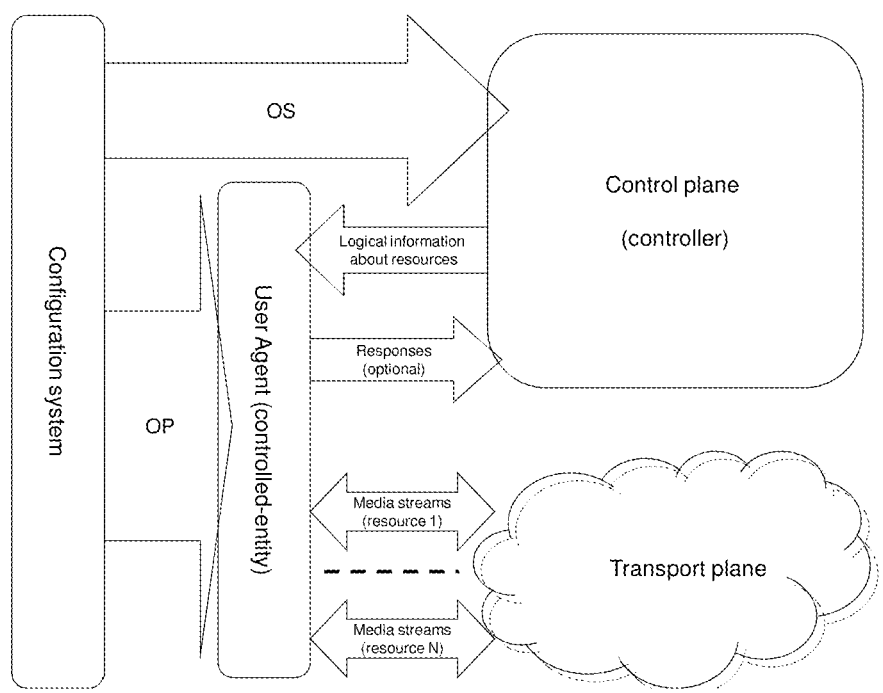
FIG. 2 is a functional diagram for resource selection in an implementation of an embodiment of the invention.

As shown in FIG. 2, the configuration system (in particular the so-called "information system") that manages the network as a whole therefore needs, on each installation or update, to ensure that the controller and the controlled-entity are using each available resource identifier in complementary manner. That is why:

firstly (operation "OS" in FIG. 2), a configuration system managed by the network operator declares to the controller the resource identifier associated respectively with each of the services or uses made available to clients, after which the controller is configured accordingly; and secondly (operation "OP" in FIG. 2), the configuration system declares to the controlled-entity the resource identifier associated respectively with each of the resources accessible to the controlled-entity (made available to or subscribed to by the controlled-entity), after which the controlled-entity is configured accordingly.

In the IMS architecture envisaged herein by way of example, the exchanges between the controllers and the controlled-entities in order to select resources take the form of SIP signals. The resource identifier of an embodiment of the invention may then conventionally be included in the form of an option-tag in a new header ("Resource-control" in the examples below), which is then inserted in various SIP methods depending on the circumstances for choosing the resource by the controller and for progress in the SIP dialog. This header of an embodiment of the invention may thus particularly (but not exclusively) be inserted in the INVITE, UPDATE, re-INVITE, and INFO methods, and also in the 1XX or 2XX responses.

In a first implementation, the controller 22 does not wait for confirmation to be returned by the controlled-entity 10. There follows an example of the messages exchanged between the controller 22 and the controlled-entity 10 in this implementation:

```
MESSAGE 1, Controlled-entity => Controller:
INVITE sip: ambulance_emergency@orange.com SIP/2.0
Via: [...]
Max-Forwards: 70
To: <sip: ambulance_emergency@orange.com>
From: [...]
Call-ID: [...]
CSeq: 314159 INVITE
Contact: [...]
Content-Type: application/sdp
Content-Length: 142
(partially shown : )
v=0
    m=audio RTP/AVP 43210 8
...
MESSAGE 2, Controller => Controlled-entity:
SIP/2.0-183 Session Progress
Via: [...]
To: [...]
From: [...]
Call-ID: [...]
CSeq: 314159 INVITE
Contact: [...]
Resource-control: high_priority; no-answer
Content-Type: application/sdp
Content-Length: 131
(partially shown : )
v=0
    m=audio RTP/AVP 54321 8
...
```

In the above example, in the request from the terminal 10, the controller 22 recognizes a request for an urgent VoIP call and recommends selecting a network resource identified by the "high_priority" resource identifier, while also specifying that there is no point in sending it an answer (option-tag "no-answer").

In analogous manner, a controller may transmit a second control signal to a controlled-entity in order to recommend to the controlled-entity that it select the network resource identified in said request by a certain resource identifier. It should be observed that such a message is useful when access has been requested to a plurality of network resources, with this taking place regardless of the situation of the requester, i.e. regardless of whether the requester has access to a plurality of resources or to a single resource (in which case there is clearly no point in recommending a particular type of network resource to the requester).

In the presently-considered system, the requested controlled-entity may for example be the terminal 11 (which, it should be recalled, is likewise controlled by the controller 22). Carrying on from the above example, where the requested called party is "ambulance_emergency", the message may take the following form:

---

MESSAGE 2', Controller => Controlled-entity:
INVITE sip: ambulance_emergency@orange.com SIP/2.0
Via: [...]
Max-Forwards: 70
To: <sip: ambulance_emergency@orange.com>
From: [...]
Call-ID: [...]
Resource-control: high_priority; no-answer
CSeq: 314159 INVITE
Contact: [...]
Content-Type: application/sdp
Content-Length: 142
(partially shown : )
v=0
    m=audio RTP/AVP 43210 8
...

---

As with above message 2 with the controlled-entity 10, the controller recommends to the controlled-entity 11 that it select a network resource identified by the "high_priority" resource identifier, while also indicating in the message 2' that there is no need for the controlled-entity 11 to reply thereto (option-tag "no-answer").

It should be observed that in general it is not always possible for a controlled-entity to access a network of the type indicated by the controller. For example, if the resource identifier corresponds to an ADSL line, the controlled-entity may find that the ADSL line is unavailable (which can happen in particular when an ADSL line is not synchronized); another example occurs in the situation where the configuration has been updated in the network core but not yet with clients, such that the controlled-entity cannot interpret the resource identifier supplied by the controller.

In this first implementation, if the desired resource is not available for the controlled-entity 10, or if the controlled-entity does not recognize the request, then a default resource is selected and the SIP dialog continues normally. It should be observed that because the control plane is independent from the transport plane, the controller 22 has no means for verifying whether the multimedia stream that is subsequently set up by the controlled-entity does or does not make use of the resource recommended by the controller 22.

In a second implementation, after receiving a resource identifier from the controller 22, the controlled-entity 10 is required to respond to the controller with the identifier of the resource type that has actually been selected by the controlled-entity 10.

In this response to the controller 22 from the controlled-entity 10, the controlled-entity may advantageously make use of a header analogous to that used by the controller 22 in the resource-indicating message, i.e. including a resource identifier identical to that supplied by the controller, assuming that the requested resource type was available and has been selected. If the indicated resource type is no longer available, then the resource identifier that is inserted in the response will be different.

There follows an example of messages exchanged between a controller 22 and a controlled-entity 10 in accordance with this second implementation:

---

MESSAGE 1, Controlled-entity => Controller:
INVITE sip: james_bond@secret-services.com SIP/2.0
Via: [...]
Max-Forwards: 70
To: <sip:-: james_bond@secret-services.com>
From: [...]
Call-ID: [...]
CSeq: 314159 INVITE
Contact: [...]
Content-Type: application/sdp
Supported: 100rel
Content-Length: 142
(partially shown : )
v=0
    m=audio RTP/AVP 43210 8
...
MESSAGE 2, Controller => Controlled-entity:
SIP/2.0-183 Session Progress
Via: [...]
To: [...]
From: [...]
Call-ID: [...]
CSeq: 314159 INVITE
Contact: [...]
Resource-control: top_secret; confirm
Require: 100rel
Content-Type: application/sdp
Content-Length: 131
(partially shown : )
v=0
    m=audio RTP/AVP 54321 8
...
MESSAGE 3, Controlled-entity => Controller:
PRACK sip: james_bond@secret-services.com SIP/2.0
Via: [...]
Max-Forwards: 70
To: <sip:-: james_bond@secret-services.com>
From: [...]
Call-ID: [...]
CSeq: 314160 PRACK
Contact: [...]
Resource-control: top_secret; confirmed
Content-Length: 0
...

---

In equivalent manner, instead of above messages 2 and 3, it is possible to use the following messages 2b and 3b:

---

MESSAGE 2b, Controller => Controlled-entity:
SIP/2.0-183 Session Progress
Via: [...]
To: [...]
From: [...]
Call-ID: [...]
CSeq: 314159 INVITE
Contact: [...]
Resource-control: top_secret;
Require: 100rel; resource-control
Content-Type: application/sdp
Content-Length: 131
(partially shown : )
v=0

-continued

```
    m=audio RTP/AVP 54321 8
...
MESSAGE 3b, Controlled-entity => Controller:
PRACK sip: james_bond@secret-services.com SIP/2.0
Via: [...]
Max-Forwards: 70
To: <sip:-: james_bond@secret-services.com>
From: [...]
Call-ID: [...]
CSeq: 314160 PRACK
Contact: [...]
Resource-control: top_secret;
Content-Length: 0
...
```

In the above example, the controller 22 has recognized that the called party ("james_bond") belongs to the client category known as "secret-services". It therefore instructs the controlled-entity 10 to select a resource identified by the "top_secret" resource identifier. In its message 2 or 2b, the controller 22 asks the controlled-entity 10 for explicit confirmation; to do this, it uses a conventional option-tag "confirm" in the "Resource-control" header of an embodiment of the invention (message 2) or a new "resource-control" option-tag specifying the means implemented in an embodiment of the present invention, in the conventional header "Require" (message 2b).

For the response in message 3 or 3b, the controlled-entity 10 confirms that it has been able to select the resource associated with the "top_secret" resource identifier. By way of example, this resource may be a secure and encrypted IP-SEC tunnel, arranged in a specific VLAN.

As in the first implementation, the controller 22 may then optionally transmit a second control signal to the requested controlled-entity, in order to recommend selecting the network resource identified by the "top_secret" resource identifier when the requested called party potentially has access to a plurality of network resources.

An advantage of this second implementation is that it enables the controller 22 to refuse to set up a multimedia stream if it is of the opinion that the type of resource actually selected by the controlled-entity 10 is inadequate. In the above example, the controller 22 could have refused the voice call if, in message 3 or 3b, the requesting controlled-entity 10 proposed placing the call over a non-secure network.

It is clear that in this second implementation, it is very desirable for the controller to know whether the controlled-entity is properly equipped with the means necessary for being able to implement an embodiment of the invention.

Whatever the implementation of an embodiment of the invention, in order to enable the controller to know whether the controlled-entity is properly equipped with the means necessary to be able to implement an embodiment of the invention, it is possible to make provision for the following two variants.

In a first variant, a request sent by a controlled-entity 10 includes an explicit mention for this purpose. Returning to the above example, it suffices in the message 1 to replace the header
Supported: 100rel
by the header
Supported: 100rel; resource-control
i.e. including the option-tag "resource-control" of an embodiment of the invention.

In a second variant, a controller 22 requests (at any time) confirmation from a controlled-entity 10 for this purpose, by using the OPTIONS method of RFC 3261. There follows an example of such an exchange between the controller 22 and the controlled-entity 10:

```
Controller => Controlled-entity:
OPTIONS sip:controlled_entity@orange.com SIP/2.0
Via: [...]
Max-Forwards: 70
To: <sip:controlled_entity@orange.com>
From: <sip:controler@orange.com>;tag=1928301774
Call-ID: a84b4c76e66710
CSeq: 63104 OPTIONS
Contact: [...]
Accept: [...]
Content-Length: 0
Controlled-entity => Controller:
SIP/2.0 200 OK
Via: [...]
To: <sip:controlled_entity@orange.com>;tag=93810874
From: <sip:controler@orange.com>;tag=1928301774
Call-ID: a84b4c76e66710
CSeq: 63104 OPTIONS
Contact: [...]
Contact: <mailto:carol@chicago.com>
Allow: INVITE, ACK, CANCEL, OPTIONS, BYE
Accept: [...]
Accept-Encoding: [...]
Accept-Language: [...]
Supported: resource-control
```

When the controller 22 receives the above response, it knows from the "resource-control" option-tag of an embodiment of the invention that is included in the conventional "Supported" header that the controlled-entity 10 is provided with means needed for being capable of implementing an embodiment of the invention.

In contrast, if the controller 22 receives a response that does not include the "Supported" header or that includes a "Supported" header in which the "resource-control" option-tag does not appear, then the controller 22 cannot tell whether the client is capable of implementing an embodiment of the invention, i.e. whether the client can be controlled concerning network resource selection. The way in which the requests of such a client are processed then depends on the policy put into place by the operator of the network 20.

An embodiment of the invention may be implemented within telecommunications network nodes (more precisely the terminals 10 and 11, and the servers 22, 25, 26, and 27 in the implementation described above) by means of software and/or hardware components.

The software components may be incorporated in a conventional computer program for managing a network node. That is why, as stated above, an embodiment of the present invention also relates to a computer system. In conventional manner, the computer system comprises a central processor unit using signals to control a memory, and an input unit and an output unit. Furthermore, the computer system may be used to execute a computer program including instructions for implementing the network resource selection method of an embodiment of the invention.

An embodiment of the invention also provides a computer program that is downloadable from a communications network and that includes instructions for executing steps of a network resource selection method of an embodiment of the invention when executed on a computer. The computer program may be stored on a computer-readable medium and it may be executed by a microprocessor.

The program may make use of any programming language, and it may be in the form of source code, object code, or code intermediate between source code and object code, such as in a partially-compiled form, or in any other desirable form.

An embodiment of the invention also provides a computer-readable data medium, the medium including computer program instructions as specified above.

The data medium may be any entity or device capable of storing a program. For example, the medium may comprise storage means such as a read-only memory (ROM), e.g. a compact disk (CD) ROM or a microelectronic circuit ROM, or indeed magnetic recording means, e.g. a floppy disk or a hard disk.

Furthermore, the data medium may be a transmissible medium such as an electrical or optional signal, suitable for being conveyed via an electrical or optical cable, by radio, or by other means. The computer program of an embodiment of the invention may in particular be downloaded from an Internet type network.

In a variant, the data medium may be an integrated circuit in which the program is incorporated, the circuit being adapted to execute or to be used in the execution of the network resource selection method of an embodiment of the invention.

The invention claimed is:

1. A method comprising:
   selecting a network resource by a controlled-entity device which is connected to an Internet Protocol (IP) network and is configured to access in the transport plane the IP network and at least one other physical communications network or virtual telecommunications network, referred to as another physical or virtual network, wherein selecting comprises:
   said controlled-entity device sends a first session control signal to the IP network, which contains information specifying that the controlled-entity device is capable of selecting network resources among existing physical or virtual network resources by taking into account received transport plane resource identifiers;
   sending or relaying a request by said controlled-entity device in said IP network, wherein said request does not recommend that any resource, among the IP network and said other physical or virtual network, be used by the controlled-entity device in order to satisfy said request;
   after sending the first session control signal and sending or relaying the request, the controlled-entity device receiving via the IP network a second session control signal containing a transport plane resource identifier representative of the IP network or of said other physical or virtual network that the controlled-entity device is recommended or required to use in order to satisfy said request; and
   after receiving the second session control signal containing the transport plane resource identifier, a step of the controlled-entity device setting up a session corresponding to the received second session control signal by selecting a network resource either in the IP network, or in the other physical or virtual network, in the transport plane, by taking into account the transport plane resource identifier received with the second session control signal.

2. The method of selecting a network resource according to claim 1, wherein the step of selecting a network resource comprises the controlled-entity device selecting:
   a network resource in accordance with said received transport plane resource identifier if the controlled-entity device can access said network resource in order to satisfy said request, or
   another network resource if the controlled-entity device cannot access said network resource in order to satisfy said request.

3. The method of selecting a network resource according to claim 1, wherein said controlled-entity device sends the first session control signal that contains the information with the request.

4. A method of selecting a network resource, the method comprising:
   a controller device receiving from a controlled-entity device in an Internet Protocol (IP) network a first session control signal, which contains information specifying that the controlled-entity device is capable of selecting network resources among existing physical or virtual network resources by taking into account received transport plane resource identifiers;
   the controller device intercepting in the IP network a request sent or relayed by a controlled-entity device or sent to the controlled-entity device, wherein said request does not recommend that any resource, among said IP network and another physical or virtual network, be used by the controlled-entity device in order to satisfy said request; and
   after receiving the first session control signal from the controlled-entity device and intercepting the request, a step of said controller device sending to the controlled-entity device a second session control signal containing a transport plane resource identifier representative of said IP network or of some other physical or virtual network that the controlled-entity device is recommended or required to use in order to satisfy said request.

5. The method of selecting a network resource according to claim 4, further comprising:
   after sending the second session control signal, the controller device receiving from said controlled-entity device a transport plane resource identifier representative of the network resource that the controlled-entity device has selected; and
   the controller device using said information to determine whether to satisfy or reject said request.

6. The method of selecting a network resource according to claim 1, wherein the IP network uses at least H.323 or session initiation protocol (SIP) as a session control protocol.

7. A controlled-entity device connected to an Internet Protocol (IP) network and comprising:
   a non-transitory computer-readable medium comprising instructions stored thereon; and
   a processor configured by the instructions to perform acts comprising:
   accessing in a transport plane at least one other physical communications network or virtual telecommunications network, referred to as another physical or virtual network;
   sending a first session control signal to the IP network, which contains information specifying that the controlled-entity device is capable of selecting network resources among existing physical or virtual network resources by taking into account received transport plane resource identifiers;
   sending or relaying in said IP network a request that does not recommend that any resource, among the IP network and said other physical or virtual network, be used by the controlled-entity device in order to satisfy said request;

after sending the first session control signal and sending or relaying the request, receiving via the IP network a second session control signal in response to said request;

interpreting a transport plane resource identifier contained in said received second session control signal and representative of the IP network or of said other physical or virtual network that the controlled-entity device is recommended or required to use in order to satisfy said request; and setting up a session corresponding to the received second session control signal by selecting a network resource either in the IP network, or in the other physical or virtual network, in the transport plane, by taking into account the transport plane resource identifier received with the second session control signal.

8. The controlled-entity device according to claim 7, wherein the processor of the controlled-entity device is further configured to perform acts comprising:

selecting a network resource in accordance with said received transport plane resource identifier if the controlled-entity device can access said network resource in order to satisfy said request, or selecting another network resource if the controlled-entity device cannot select said network resource in accordance with said received transport plane resource identifier in order to satisfy said request.

9. The controlled-entity device according to claim 7, wherein the processor is further configured to perform acts comprising subsequently transmitting a third session control signal to the IP network, the signal containing a transport plane resource identifier representative of the selected network resource.

10. The controlled-entity device according to claim 7, wherein the processor is further configured to send the first session control signal that contains the information with the request.

11. The controlled-entity device according to claim 7, wherein the controlled-entity device is constituted by a fixed or mobile terminal connected to the IP network.

12. The controlled-entity device according to claim 7, wherein the controlled-entity device is constituted by a home or business gateway.

13. The controlled-entity device according to claim 7, wherein the controlled-entity device is constituted by a voice gateway of a network operator.

14. A controller device situated in an Internet Protocol (IP) network and comprising:

a non-transitory computer-readable medium comprising instructions stored thereon; and a processor configured by the instructions to perform acts comprising:

receiving from a controlled-entity device in the IP network a first session control signal, which contains information specifying that the controlled-entity device is capable of selecting network resources among existing physical or virtual network resources by taking into account received transport plane resource identifiers;

intercepting a request sent or relayed by a controlled-entity device or sent to the controlled-entity device, wherein said request does not recommend that any resource, among said IP network and another physical or virtual network, be used by the controlled-entity device in order to satisfy said request; and after receiving the first session control signal from the controlled-entity device and intercepting the request, sending to said controlled-entity device a second session control signal containing a transport plane resource identifier representative of said IP network or some said other physical or virtual network that the controlled-entity device is recommended or required to use in order to satisfy said request.

15. The controller device according to claim 14, wherein the processor is further configured to perform acts comprising determining whether to satisfy or reject said request on the basis of a third session control signal received from said controlled-entity device and containing a transport plane resource identifier representative of the network resource selected by the controlled-entity device.

16. The controller device according to claim 14, wherein the processor is further configured to perform acts comprising receiving the first session control signal containing the information with the intercepted request.

17. The controller device according to claim 14, wherein the controller device is constituted by an application server.

18. The controller device according to claim 14, wherein the IP network has IP multimedia subsystem (IMS) type infrastructure, and said controller device is constituted by a service-call session control function (S-CSCF) or a combined interrogating-call server control function and servicing-call session control function (US-CSCF) type call server.

19. Permanent or partially or completely removable, non-transitory data storage medium including computer program code instructions for executing steps of a network resource selection method when the instructions are executed by a controlled-entity device, the method comprising:

selecting a network resource by a controlled-entity device which is connected to an Internet Protocol (IP) network and is configured to access in the transport plane the IP network and at least one other physical communications network or virtual telecommunications network, referred to as another physical or virtual network, wherein selecting comprises:

said controlled-entity device sends a first session control signal to the IP network, which contains information specifying that the controlled-entity device is capable of selecting network resources among existing physical or virtual network resources by taking into account received transport plane resource identifiers;

sending or relaying a request by said controlled-entity device in said IP network or is sent to said controlled-entity device, wherein said request does not recommend that any resource, among the IP network and said other physical or virtual network, be used by the controlled-entity device in order to satisfy said request;

after sending the first session control signal and sending or relaying the request, the controlled-entity device receiving via the IP network a second session control signal, in response to the request, containing a transport plane resource identifier representative of the IP network or of said other physical or virtual network that the controlled-entity device is recommended or required to use in order to satisfy said request; and after receiving the second session control signal containing the transport plane resource identifier, a step of the controlled-entity device setting-up a session corresponding to the received second session control signal by selecting a network resource either in the IP network, or in the other physical or virtual network, in the transport plane, by taking into account the transport plane resource identifier received with the second session control signal.

20. Permanent or partially or completely removable, non-transitory data storage medium including computer program code instructions for executing steps of a method of selecting a network resource, the method comprising:
a controller device receiving from a controlled-entity device in an Internet Protocol (IP) network a first session control signal, which contains information specifying that the controlled-entity device is capable of selecting network resources among existing physical or virtual network resources by taking into account received transport plane resource identifiers;
a step of the controller device intercepting in the IP network a request sent or relayed by a controlled-entity device or sent to the controlled-entity device, wherein said request does not recommend that any resource, among said IP network and another physical or virtual network, be used by the controlled-entity device in order to satisfy said request; and
after receiving the first session control signal from the controlled-entity device and intercepting the request, a step of said controller device sending to the controlled-entity device a second session control signal containing a transport plane resource identifier representative of said IP network or of some other physical or virtual network that the controlled-entity device is recommended or required to use in order to satisfy said request.

21. A method comprising:
selecting a network resource by a controlled-entity device which is connected to an Internet Protocol (IP) network and is configured to access in the transport plane the IP network and at least one other physical communications network or virtual telecommunications network, referred to as another physical or virtual network, wherein selecting comprises:
said controlled-entity device sending a first session control signal to the IP network, which contains information specifying that the controlled-entity device is capable selecting network resources among existing physical or virtual network resources by taking into account received transport plane resource identifiers;
after sending the first session control signal, sending by the controlled-entity device a request in said IP network, wherein said request does not recommend that any resource, among the IP network and said other physical or virtual network, be used by the controlled-entity device in order to satisfy said request;
after sending the first session control signal and sending or relaying the request, receiving by the controlled-entity device via the IP network a second session control signal containing a transport plane resource identifier representative of the IP network or of the other physical or virtual network that the controlled-entity device is recommended or required to use in order to satisfy said request; and
after receiving the second session control signal containing the transport plane resource identifier, the controlled-entity device setting-up a session corresponding to the received second session control signal by selecting a network resource either in the IP network, or in the other physical or virtual network, in the transport plane, by taking into account the transport plane resource identifier received with the second session control signal.

22. The method of selecting a network resource according to claim 21, wherein the step of selecting a network resource comprises the controlled-entity device selecting:
a network resource in accordance with said received transport plane resource identifier if the controlled-entity device can access said network resource in order to satisfy said request, or
another network resource if the controlled-entity device cannot access said network resource in order to satisfy said request.

23. A controlled-entity device connected to an Internet Protocol (IP) network and comprising:
a non-transitory computer-readable medium comprising instructions stored thereon; and
a processor configured by the instructions to perform acts comprising:
accessing in the transport plane at least one other physical communications network or virtual telecommunications network, referred to as another physical or virtual network;
sending a first session control signal to the IP network, which contains information specifying that the controlled-entity device is capable of electing network resources among existing physical or virtual network resources by taking into account received transport plane resource identifiers;
after sending the first session control signal, sending a request to said IP network, wherein said request does not recommend that any resource, among the IP network and said other physical or virtual network be used by the controlled-entity device in order to satisfy said request;
receiving via the IP network a second session control signal in response to said request;
interpreting a transport plane resource identifier contained in said received second session control signal and representative of the IP network or of the other physical or virtual network that the controlled-entity device is recommended or required to use in order to satisfy said request; and
setting-up a session corresponding to the received second session control signal by selecting a network resource either in the IP network, or in the other physical or virtual network, in the transport plane, by taking into account the transport plane resource identifier received with the second session control signal.

24. The controlled-entity device according to claim 23, wherein the selecting comprises:
selecting a network resource in accordance with said received transport plane resource identifier if the controlled-entity device can access said network resource in order to satisfy said request, or
selecting another network resource if the controlled-entity device cannot select said network resource in accordance with said received transport plane resource identifier in order to satisfy said request.

* * * * *